United States Patent
Lipton et al.

(10) Patent No.: US 7,804,995 B2
(45) Date of Patent: Sep. 28, 2010

(54) STEREOSCOPIC FORMAT CONVERTER

(75) Inventors: Lenny Lipton, Greenbrae, CA (US); Mark H. Feldman, Walnut Creek, CA (US)

(73) Assignee: RealD Inc., Beverly Hills, CA (US)

( * ) Notice: Subject to any disclaimer, the term of this patent is extended or adjusted under 35 U.S.C. 154(b) by 1220 days.

(21) Appl. No.: 10/613,866

(22) Filed: Jul. 2, 2003

(65) Prior Publication Data

US 2007/0183650 A1    Aug. 9, 2007

(51) Int. Cl.
*G06K 9/00* (2006.01)

(52) U.S. Cl. .................................................. 382/154

(58) Field of Classification Search ........................ None
See application file for complete search history.

(56) References Cited

U.S. PATENT DOCUMENTS

| | | | | |
|---|---|---|---|---|
| 5,138,697 | A * | 8/1992 | Yamamoto et al. | 345/420 |
| 5,481,275 | A * | 1/1996 | Mical et al. | 345/698 |
| 5,982,941 | A * | 11/1999 | Loveridge et al. | 382/260 |
| 6,556,236 | B1 * | 4/2003 | Swift et al. | 348/56 |
| 6,862,043 | B1 | 3/2005 | Song | |
| 2002/0011969 | A1 | 1/2002 | Lipton et al. | |
| 2002/0122585 | A1 * | 9/2002 | Swift et al. | 382/154 |
| 2004/0218269 | A1 | 11/2004 | Divelbiss et al. | |
| 2005/0117637 | A1 | 6/2005 | Routhier et al. | |
| 2005/0122395 | A1 | 6/2005 | Lipton et al. | |

FOREIGN PATENT DOCUMENTS

| GB | 2309847 | 8/1997 |
|---|---|---|
| JP | 2002025182 | 1/2002 |

OTHER PUBLICATIONS

Lipton, Stereo-Vision Formats for Video and Computer Graphics, 1997.
International Preliminary Report on Patentability for PCT/US05/33358 mailed Mar. 20, 2009.
Supplementary European Search Report in co-pending European patent application No. 0579785.8 filed Sep. 16, 2005, EP 1943558 published Jul. 16, 2008 (RealD Inc., parent company of applicant Stereographics Corporation).

* cited by examiner

*Primary Examiner*—Wes Tucker
*Assistant Examiner*—Elisa M Rice
(74) *Attorney, Agent, or Firm*—Baker & McKenzie LLP

(57) ABSTRACT

A device and method for converting one stereoscopic format into another. A software-enabled matrix is used to set forth predefined relationships between one type of format as an input image and another type of format as an output image. The matrix can then be used as a look-up table that defines a correspondence between input pixels and output pixels for the desired format conversion.

20 Claims, 7 Drawing Sheets

FIG. 2

*Display*

| | Left | Right | Free Viewing | Page Flipping | Sync Doubled | SynthaGram | Anaglyph (Mono) | Anaglyph (Poly) | Interline |
|---|---|---|---|---|---|---|---|---|---|
| Planar | | | | | | | | | |
| Above/Below | | | | | | | | | |
| Side By Side | | | | | | | | | |
| Side By Side Squashed | | | | | | | | | |
| Interline | | | | | | | | | |
| Stereo Pair | | | | | | | | | |
| Nine Tile | | | | | | | | | |
| Stereoized | | | | | | | | | |
| Interzigged | | | | | | | | | |
| Anaglyph | | | | | | | | | |

*Source* (row axis label); 20

Input　　　　　　　　Output

Input　　　　　　　　Output

STEREOSCOPIC FORMAT CONVERTER

BACKGROUND OF THE INVENTION

With the rise of electronic stereoscopy in the last two decades, different formats have been used to produce stereoscopic images. The subject is discussed in Lipton's paper in the 1997 SPIE Proceedings *Stereoscopic Displays and Virtual Reality Systems IV* volume 3012 entitled *Stereovision Formats For Video And Computer Graphics*. The formats sometimes involve means for producing a sequence of fields, and require selection devices employing electro-optical shutters for occluding and passing fields. In this way each eye of the viewer sees its appropriate perspective view. In some cases, the parts of the electro-optical system are distributed, covering the monitor with a modulator and passive eyewear at the eyes of the beholder.

Many formats come down to the same thing—an alternating sequence of left and right fields. Also common is page flipping, which requires a stereo-ready video graphics board that can accept the proper calls from, typically, an open GL application, which can then signify or index the appropriate field so that each eye sees its appropriate image. Other means have been created in addition to the page-flipping mode, which is one that is common on UNIX workstations but less common on Windows workstations. The above/below format (sometimes called sync doubling) invented by Lipton et al. is a format that is not board dependent, as described in U.S. Pat. No. 4,523,226, entitled *Stereoscopic Television System*. This is a commonly used technique, but it does not allow stereoscopic windows to be produced, and it has other disadvantages, although it will function without regard to the video board used.

Another approach, the interlace approach, uses alternating fields running at the usual repetition rate, for example, 60 or 70 fields per second, and thereby produces a flickering image. This is a method that has been used for video systems, and it can be used for DVD encoding of stereo images as described in co-pending and commonly assigned U.S. application Ser. No. 10/150,595 entitled Plano-Stereoscopic DVD Movies.

Another method, the interline method, writes left and right lines on the same video field and squelches them using a "dongle" which connects to the VGA video port of the computer. In this way, left and right images are passed at the discretion of the dongle, which alternately squelches left and right lines.

There are some people (children especially) who are perfectly content with the redoubtable anaglyph which uses color encoding of the left and right images. This method was described almost a century-and-a-half ago and is most often used with red and green or red and blue filters. There are two major variants. One is a polychrome anaglyph that attempts to give some semblance of color. The other is a more traditional monochrome anaglyph that is probably more pleasant for most people to look at, but lacks the pizzazz of having a color effect.

CRT monitors allow for field-sequential or alternate-field stereoscopic displays (described above), whereas liquid crystal displays do not because of image lag. In order to see a stereo image on a liquid crystal display, the anaglyph is required. Another method for use on such an uncooperative monitor would be to place the left and right images side by side, in which case they can be free viewed (no selection device) by people who have the knack. There's also the possibility of using lorgnettes, or eyewear that have prisms in them, so that the images can be converged for the observer.

StereoGraphics Corp. of San Rafael, Calif., sells SynthaGram® autostereoscopic monitors which use a special multi-tile format; yet another format variation to be reckoned with.

This disclosure addresses material that is produced in one format and then disseminated to users without knowledge of the user's hardware or its ability to play back the image. For example, an above-and-below formatted image might be sent to someone who has a laptop with a built-in liquid crystal display screen. Can he/she view the stereo image? Generally no—unless, for example, the image can be transformed into an anaglyph which is independent of the display's ability to refresh at a given rate without fields blending into each other.

In general, there are a wide variety of formats and many kinds of PC's and monitors in use and not a high degree of certainty that a user will be able to view stereoscopically in the format received.

In addition, there are people who would like to see stereoscopic images but who have planar stills or movies to look at. These people might enjoy seeing a stereoscopic image for the novelty's sake. Even if it isn't a true stereoscopic image, it might be pleasant, in some circumstances, to provide an ersatz stereoscopic image.

SUMMARY OF THE INVENTION

A device and method for converting one stereoscopic format into another is disclosed. In addition, a method for creating ersatz stereo images is disclosed. In general, an input image and an output image are each defined by a plurality of pixels. According to the invention, a software-enabled matrix is used to set forth predefined relationships between one type of format as an input image and another type of format as an output image. More specifically, the matrix is a look-up table that defines a correspondence between input pixels and output pixels for the desired format conversion.

BRIEF DESCRIPTION OF THE DRAWINGS

FIG. 2 is a diagram showing a source/display matrix for the stereoscopic content converter.

DESCRIPTION OF THE INVENTION

Figure 1A:
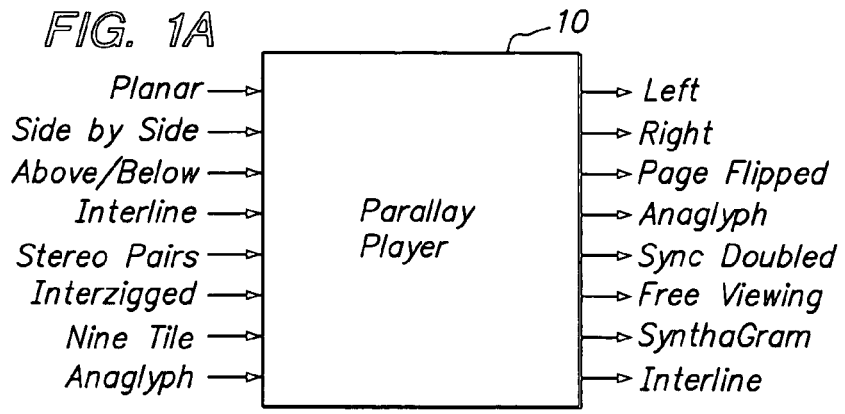
FIG. 1A is a block diagram showing a stereoscopic content converter.

FIG. 1A shows a stereoscopic content converter 10. The stereoscopic content converter is a software-enabled utility that converts images from one format to another. FIG. 1A also shows exemplary formats that may be inputted and outputted. Thus, the stereoscopic content converter 10 is able to take any one of a wide variety of different image formats and play them back on many different kinds of PC's and display screens. Another advantageous feature is the capability to "stereo-ize" a planar still or movie image. The means for accomplishing this and other aspects of the invention are set forth below.

The content player 10 handles two basic forms of digital content—still images and movies. For simplicity, this description assumes a movie is a series of still image frames and does not consider intermediate compression, headers, or other storage details that are routinely handled by the software media framework. It is assumed that all data is digital, either created by means of a photographic film process and later digitized, or directly captured or authored in a digital form. As currently implemented and tested, the stereoscopic content converter 10 is able to run on a number of Windows Operating Systems and read in a broad selection of contemporary file formats. However, it would be a routine matter for a programmer to convert the application to run on a different operating system.

There are numerous conventional media frameworks available today to allow an application to process movie data. Typical processing steps include opening, starting, stopping, pausing and seeking. The preferred framework used in the present implementation of the stereoscopic content converter 10 is Microsoft's DirectShow (a component of Microsoft's Direct X technology). Other frameworks, such as Apple's Quick Time Player, could also be used. Although typically used in the context of movie data, media frameworks can also handle still image data as well.

A user interface is provided for the converter 10 and preferably includes a set of VCR-like controls for manipulating the video—start, stop, pause, rewind and fast forward. The user can also adjust the speed, volume control, and balance. The converter can provide visual control feedback in the interface to allow the user to precisely adjust these settings. As with most modern media viewers, the stereoscopic content converter 10 is configured to allow a user to view content in both windowed and full screen display modes.

This media content is opened by the stereoscopic content converter 10 and displayed to a user. In its current implementation, the converter 10 is used as a real-time format converter. No storage of the displayed content is provided. It is an obvious extension to provide for this, but because of extensive output disk operations, this would typically compromise the playback speed performance.

Figure 1B:
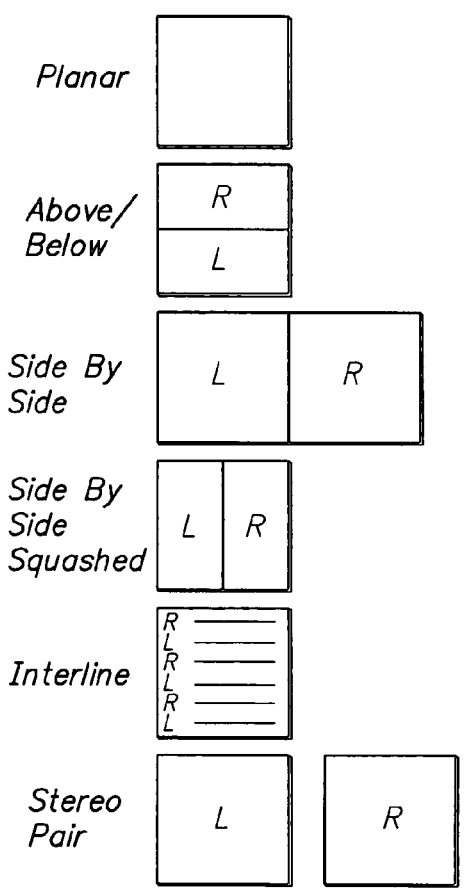
FIG. 1B illustrates several types of conventional source formats typically used as inputs for the stereoscopic content converter.
Figure 1B:
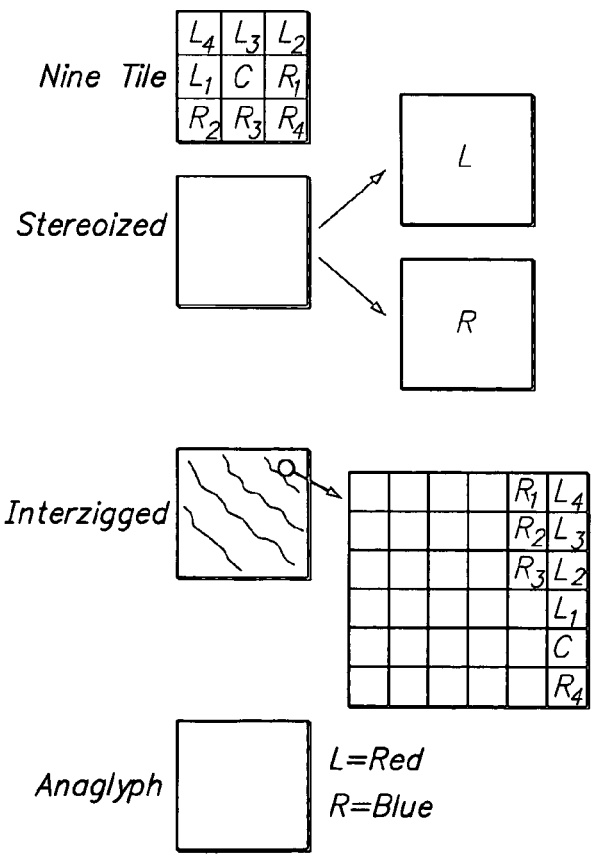

The word "Source" as used herein refers to the input format of the media. An illustration of the various potential source formats that a versatile software stereo player should be able to handle is shown in FIG. 1B. It is not a complete listing, but diverse enough to show the variation existing in the art. Note that there are some established conventions as to how left and right data are stored. Also, a square aspect ratio is shown to illustrate the scaling of the frames within the source format.

The following is a guide to understanding FIG. 1B:

Planar: A non-stereo image.

Above/below: Two vertically squashed stereo images with the right image on top of the left image.

Side-by-side: Two full size images with the right image on the left side.

Side-by-side Squashed: Two horizontally squashed image pairs with the right image on the left side.

Interline: Two horizontally squashed image pairs interwoven, with the first line containing the first line from the right image, the second line containing the first line from the left image, the third line containing the second line from the right image, and so forth.

Interlace: Relies on using the odd and even fields of a video image to display left and right (or right and left) images.

Stereo pair: Two full size images, one left and one right.

Nine Tile: Nine ⅓ sized stereo images stored in a 3×3 grid. The upper left image is the far left image and the lower right is the far right image. This format is used for StereoGraphics' SynthaGram® monitor.

Stereo-ize: Two stereo synthesized full size images, one left and one right.

Interzigged image: A full size image comprising an optically formed pattern of 9 stereo images. This format is used for StereoGraphics' SynthaGram® monitor.

Anaglyph: A full size image comprising a red/blue colored image from stereo pairs.

Figure 1C:
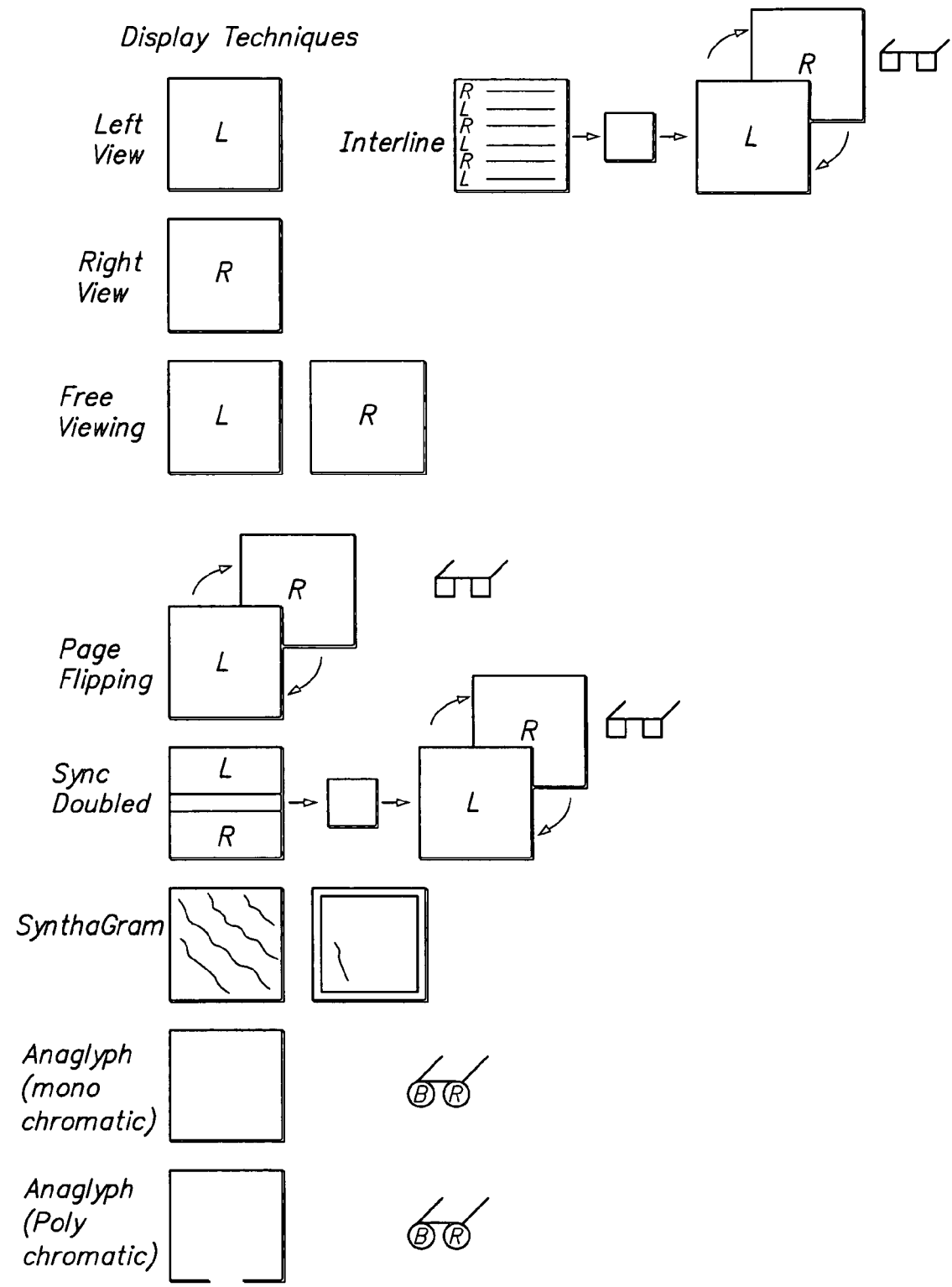
FIG. 1C illustrates various display techniques provided as outputs by the stereoscopic content converter.

The word "Display" refers the output technique used to present the stereo content to the user. An illustration of the various potential displays that a versatile software stereo player should be able to handle is shown in FIG. 1C. Again, it is not a complete list, but diverse enough to show the variation existing in the art. Also, a square aspect ratio is shown to illustrate the scaling of the frames in the display The following is a guide to understanding FIG. 1C:

Left view: The left view of a stereo pair.

Right view: The right view of a stereo pair.

Free viewing: Both left and right views shown together, with the left on the left side and the right on the right side.

Page flipped: The left and right views shown alternatively by means of a graphics card flipping operation, with the flipping occurring in sequence with synchronized active shuttering eyewear.

Sync doubled: The left and right views shown alternatively by means of a video signal modifier, which introduces vertical sync pulses between artificially created sub-fields. Shuttering eyewear are synchronized with the resultant field sequential images displayed on an appropriate monitor. The term sync doubled is synonymous with the above/below format.

SynthaGram: Nine views are shown together by means of a special optically designed autostereo monitor requiring no eyewear.

Anaglyph—monochromatic: Left and Right view intensity information stored in the color channels and viewed with red/blue-filtered eyewear.

Anaglyph—polychromatic: Left and Right view color information stored in the color channels and viewed with red/blue filtered passive eyewear.

Figure 3:
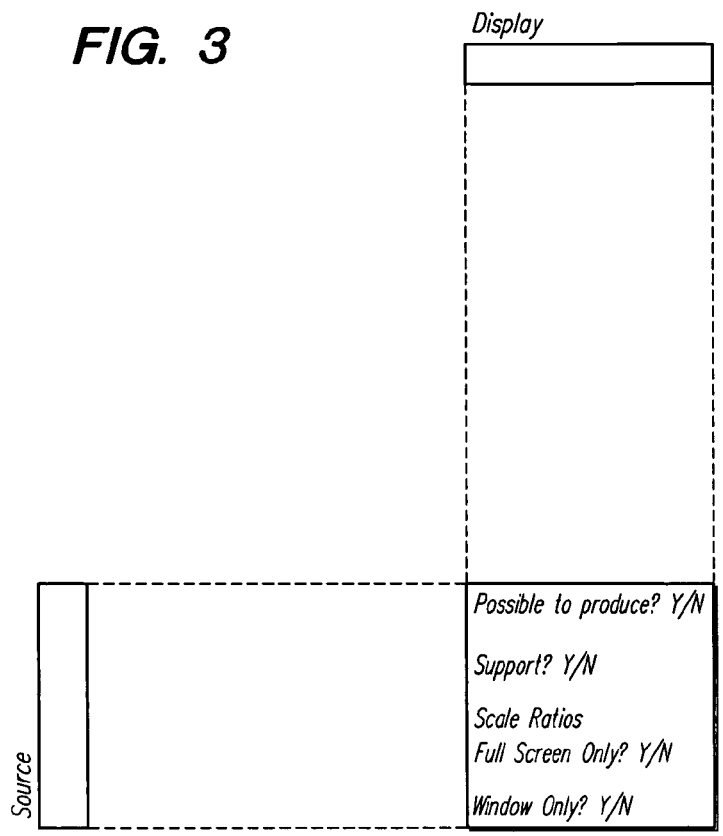
FIG. 3 is a diagram of a single source/display matrix cell.

As illustrated in FIG. 2, a matrix 20 can be formed with the source formats along the vertical axis and the display methods along the horizontal axis. Each element 21 of the matrix 20, as shown in FIG. 3, can contain the following information: 1) whether that combination is possible to produce, and 2) whether that combination is supported in the viewer. Several stereo source formats are either fully or partially irreversible to the original left, right image pairs. In some cases, the resulting images are scaled up, or have lost color information, or are simply not possible to reconstruct. For example, showing the right view of an anaglyph source results in a gray scale image with the color information being lost. Another example is showing the right view of a side-by-side horizontally squeezed source that must result in a scaled image.

All of this information is enumerated into a support matrix table 20, which can be software enabled in the stereoscopic content converter 10. Aside from properly handling the scaling aspects, this table 20 is used to prevent invalid combinations from being available and selectable by the user.

Given any single supported combination of source and display selections, a hardcoded geometric based transformation can be developed and used in a specialized software application. Although this approach would be quite efficient, it is limited to that particular combination.

To support the more generic approach to many combinations of source and display selections, a generalized processing pipeline has been developed. This pipeline contains well-defined processing stages that handle an input frame and move it along on its way to eventually being displayed to the user. The input frame is either a single frame in a movie file or an individual image file. In this model, the output of one stage is taken as the input of the next stage. If a stage is not required, the output is efficiently passed through onto the next stage.

A tradeoff between processing speed and accuracy needs to be taken into account. In many cases, exact scaling or color handling is not nearly as critical as the ability to play at a predefined frame rate. Also, the ability to leverage the specialized graphics processing power in current video cards is important to achieve. Rather than designing for the least capable graphics card, a scheme of querying for supported capability is used.

For this implementation of the above mentioned source formats, a maximum of nine stereo views is required. This is not a rigid requirement, and the implementation can be easily expanded to handle stereo solutions requiring more views.

Figure 4:
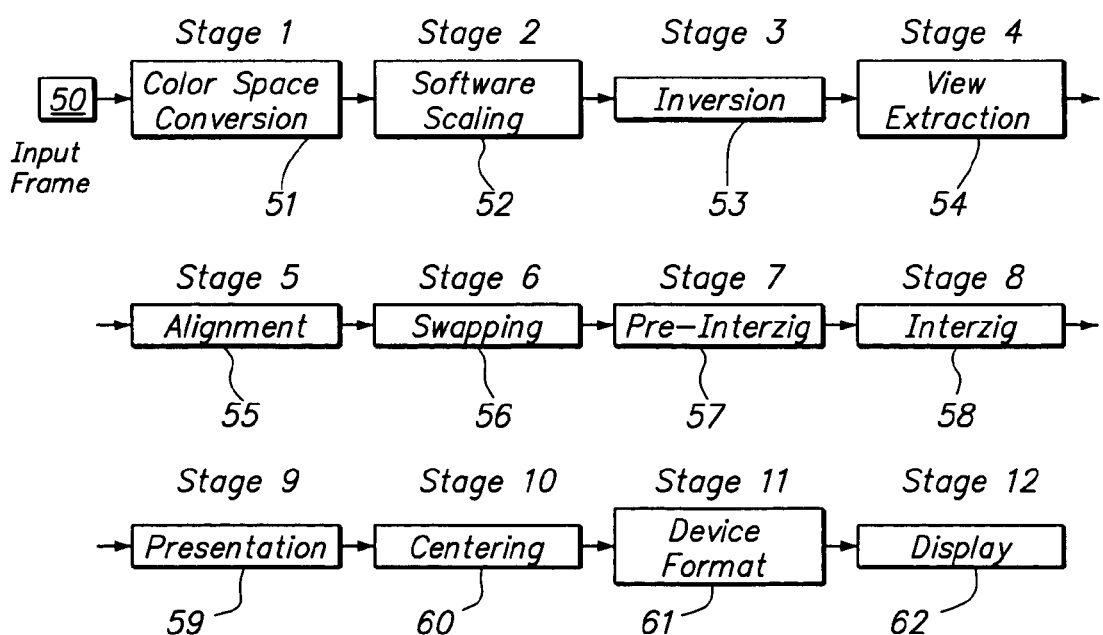
FIG. 4 is a block diagram of a pipeline for the stereoscopic content converter.

These stages are set up ahead of time so that processing of animation frames can be done as efficiently as possible. A small performance hit is taken every time the source/display combination is changed. However, during a movie playback, the processing of each frame is made as efficient as possible. These stages are illustrated in FIG. 4 and described below:

Stage 1—Color Space Conversion 51: A uniform color space is needed throughout the pipeline. In a preferred implementation, the color space chosen is a R8G8B8, where each Red, Green, and Blue component is defined as one byte each.

Stage 2—Software Scaling 52: The frame is symmetrically scaled to a larger or smaller size. Although various averaging techniques (e.g. bilinear filtering) can be implemented, for efficient mapping processing (described below), a simpler scheme was implemented. For each output pixel in the scaled frame, the single closest input pixel is chosen.

The software scale factor used is the same horizontally and vertically. The value of the scale factor is determined by the specific source/display combination, the size of the output window, and whether the graphics card can perform scaling.

Many graphics cards are capable of efficiently doing image scaling as a final step before presenting the image on the screen. However to take advantage of that feature, all scaling needs to be deferred until the last stage.

Stage 3—Inversion 53: Based on some image formats, the frame may need to be inverted so that the bottom line becomes the top line. In some cases, this is required because the media framework inverts, in other cases, the output graphics system convention requires it.

Stage 4—Views 54: The objective of this stage is to create the various stereo views that will be needed later in the pipeline. Depending on the source/display combination—one, two or nine views may be needed. These views can be easily extracted in a geometric manner from the input of the previous stage. The special case of stereo-izing is discussed below.

Stage 5—Alignment 55: For correct stereo viewing, the views may need to be aligned in a horizontal or vertical direction, or even rotational. Allowing for alignment gives the user an easy tool to compensate for ill formed stereo views. This calculation is a simple shifting (or rotating) of the views, replacing lost pixels with black ones. Pixel units used in defining the shifting must correlate to final screen units. Hence, no hardware scaling is done when an alignment is to occur.

Stage 6—Swapping 56: The need to swap views is an inherent requirement when viewing stereo media. At various points during the creation to viewing of stereo images, there lies the opportunity to introduce an unwanted swap of the left/right pair. During this stage, either the two views are swapped (views 1,2 become views 2,1) or all nine views are swapped (views 1,2,3,4,5,6,7,8,9 become views 9,8,7,6,5,4,3,2,1).

Stage 7—Pre-Interzig 57: This stage is required for SynthaGram® Autostereo displays, which require an optically defined arrangement of pixels created by an "interzigging" process. To prepare for this interzigging operation, a pre-defined view arrangement needs to be set up. This arrangement is equivalent to the nine tile source format described above where a single frame contains nine tiles, each tile containing a scaled down version of one of the nine views. Two views can also be supported in this format by duplicating the views in the nine tile arrangement (e.g. View 1 is used in Tiles 1-4 and View 2 is used in Tiles 5-9). If no interzigging is to be performed, this stage is passed through.

Stage 8—Interzig 58: The algorithm used to interzig may be considered a black box and hence hidden to the application. The interzig algorithm may be accessed through various software methods including a single function call. Depending on the model of autostereo monitor used, a different algorithm or the same algorithm with different parameters is used. Using the pixel arrangement set up in the previous stage, the interzigging operation is now performed. The result is an interzigged image, which is viewable on a SynthaGram monitor. Because of the precise arrangement of views stored in the pixels, interzigged images can not be scaled. If no interzigging is to be performed, this stage is passed through.

Stage 9—Presentation 59: The image now needs to be prepared on a presentation area that corresponds to the particular display method. This presentation represents the image that the user will eventually see on the screen. This stage is either a simple copy of the previous stage, or involves combining several views for the presentation. One example is that in the case of a sync-doubled display, both the left and right views are combined in a single presentation. Another example is that for an anaglyph representation, color components from both the left and right pixel views are combined. A third example is that for a page-flipped display, two presentations (one for each view) are required to be constructed.

Stage 10—Centering 60: The presentation needs to be properly placed so that it appears centered to the user. This stage looks at the size of the display window (or full screen dimensions) and centers the presentation. For some displays (such as the SynthaGram), correct placement of the image relative to the monitor is critical to achieve a balanced viewing effect of the stereo images.

Stage 11—Device Format 61: Up until now, the previous stages have used a predefined color space. In this stage, the presentation is converted to the color format used by the graphics display. For some display techniques, such as those using OpenGL libraries, this stage is performed transparently in graphics libraries. In other cases, a conversion to a specific color space is needed (e.g. R8G8B8 to R5G6B6 or R8G8B8 to R8G8B8A8). This conversion typically involves rearranging the components, adding an alpha component, quantizing components from 8 bits to 6 bits, and reorganizing components into a different number of bytes.

Stage 12—Display 62: In this stage, the image is actually displayed to the user using one of several display techniques including page flipping. Hardware scaling of the image may occur here as well.

If each frame of an animation is processed using these stages, the correct display will result—however, the processing performance will be quite slow. A mapping technique can be employed to efficiently combine most of these stages into a single operation.

Figure 5:
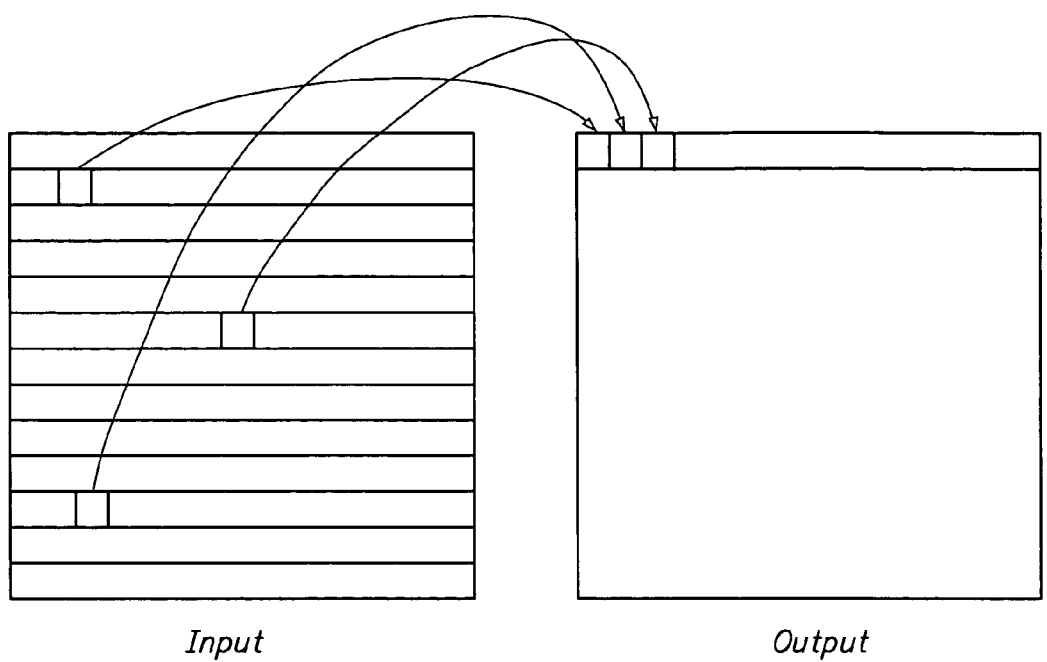
FIG. 5 is a diagram of a mapping technique used in the stereoscopic content converter.
Figure 6:
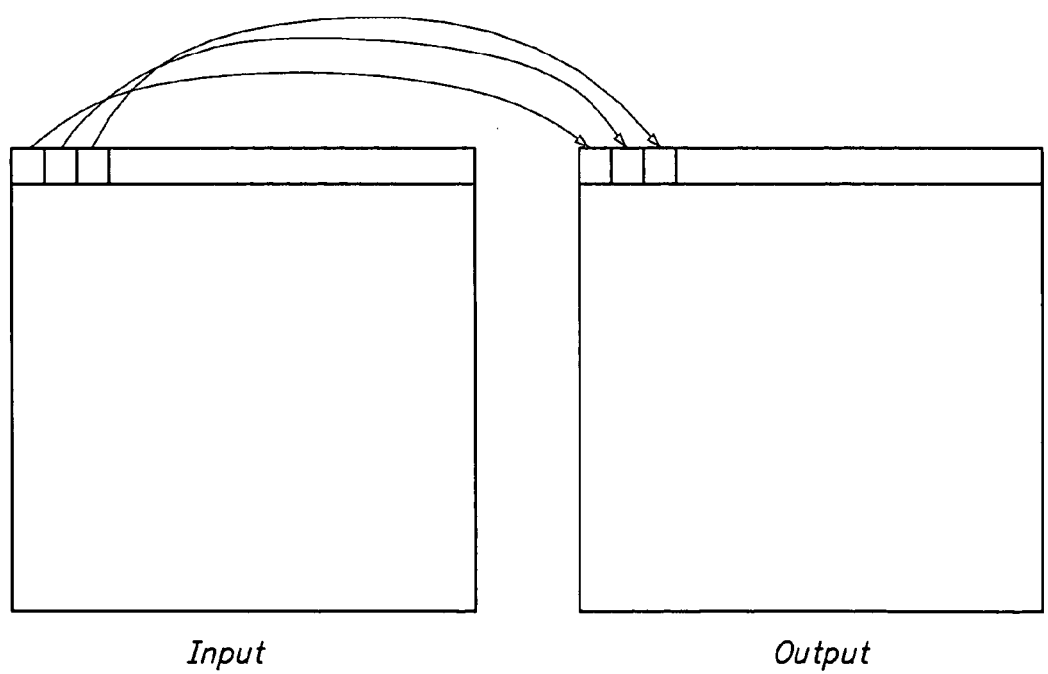
FIG. 6 is a diagram illustrating identity mapping for the stereoscopic content converter.

Each stage represents a transformation from an input image space to an output image space. A map can be defined as shown in FIG. 5, which describes for each output pixel component the proper pixel component in the input image space to use. Mapping requires that no combining or mixing of pixels be allowed; however, it allows for the input and output spaces to be different dimensions. For a stage that is simply passed through, an identity map, as shown in FIG. 6, can be set up. Also, because these maps are defined on a component basis (rather than a pixel basis), they need to be defined in terms of a consistent pixel format (e.g. R8G8B8).

The following maps can now be defined:
Stage 1 Map: Color Space Conversion to input frame
Stage 2 Map: Software Scaled to Color Space Conversion
Stage 3 Map: Inversion to Software Scaled
Stage 4 Map(s): Views to Inversion
Stage 5 Map(s): Aligned Views to Views
Stage 6 Map(s): Swapped Views to Aligned Views
Stage 7 Map: Pre-Interzig to Swapped Views
Stage 8 Map: Interzig to Pre-Interzig
Stage 9 Map: Presentation to Interzig
Stage 10 Map: Centering to Presentation Stages 11 and 12 cannot be handled in the same pixel format, so no map is created for them.

Figure 7:
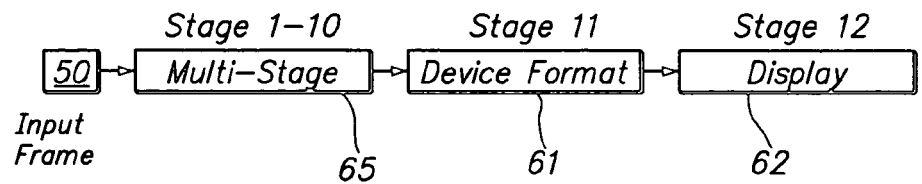
FIG. 7 is a diagram of the stereoscopic pipeline having a multistage.

Once these maps are defined, it is a greatly efficient step to concatenate them, creating a single multistage map 65 for performing all ten stages, as shown in FIG. 7. This greatly simplifies the pipeline. Given an input image, the centered image can be constructed by simply using the multistage map and looking up each pixel component in the input image. This is a critical performance step and having at most one operation per pixel component is optimal.

We will now describe what we call the "Stereo-ize" function. A user may desire to create stereo image pairs from a single planar source that has been created with no stereo information. The stereoscopic content converter 10 uses two methods to synthesize these pairs, both of which are congruent with the mapping approach described above. These methods are simplistic approximations to a more difficult problem of accurately synthesizing stereo views by analyzing structure within the source image. These approximations are based on simple 3D rotations of the source image to create a second image. Using the original source image and the created second image together gives an implied stereo effect. This technique is also well-suited for the stereoscopic content converter architecture.

Figure 8:
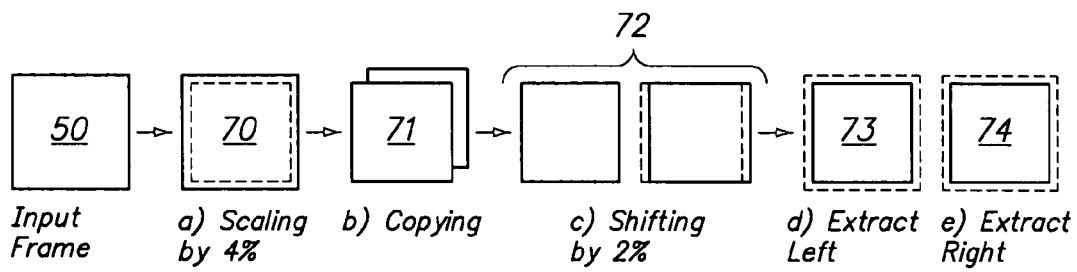
FIG. 8 is a diagram that illustrates a shifting method to stereo-ize an image.

The first method, "Shifting", as shown in FIG. 8, involves the following steps:

a) Symmetrically scaling the image by a fixed percentage as shown in step 70. We have found that 4% works well for many images. Consider this scaled image to be the scaled left image.

b) Make a copy of the scaled left image to create a scaled right image as shown in step 71.

c) Shift the scaled right image by half of the scaling percentage, as shown in step 72. Ignore any pixels "lost" and "gained" during the shifting.

d) Extract a centered image of the original image size from the scaled left image, as shown in step 73. This is the stereo-ized left image.

e) Extract a centered image of the original image size from the shifted/scaled right image, as shown in step 74. This is the stereo-ized right image.

Figure 9:
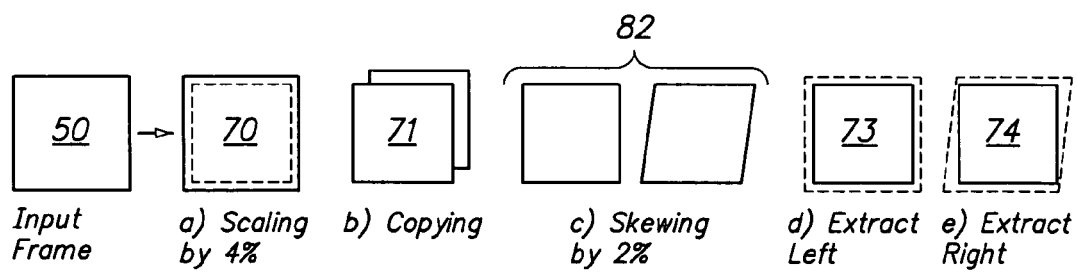
FIG. 9 is a diagram that illustrates a skewing method to stereo-ize an image.

The second method, "Skewing", as shown in FIG. 9, involves the following steps:

a) Symmetrically scaling the image by a fixed percentage, as shown in step 70. We have found that 4% works well for many images. Consider this scaled image to be the scaled left image.

b) Make a copy of the scaled left image to create a scaled right image, as shown in step 71.

c) Skew the scaled right image by half of the scaling percentage, as shown in step 82. Ignore any pixels "lost" and "gained" during the shifting.

d) Extract a centered image of the original image-size from the scaled left image, as shown in step 73. This is the stereo-ized left image.

e) Extract a centered image of the original image size from the shifted/scaled right image, as shown in step 74. This is the stereo-ized right image.

Although the scaling/skewing percentage is preferably fixed in the stereoscopic content converter 10, it is an obvious extension to allow the user to define the percentage. Also, as shown in FIGS. 8 and 9, both methods are a subset of an infinite number of directions to apply a shift and skew. Hence, it is also an obvious extension to allow the user to specify the direction of the stereo effect and its magnitude.

Implementing these methods in the staged pipeline described above is straightforward. Steps a and b are performed in the software scaling stage. Steps c, d, and e are performed in the view stage.

The Shifting method is known in the prior art and has been implemented by inventors and manufacturers on many occasions. It is a direct outgrowth of experiments done more than a century ago that established that horizontal shifting of one image of a stereo pair can move the entire image away from the observer.

The Skewing method provides an ersatz stereo effect and is based on a prior art method that was disclosed as a hardware implementation. Skewing, as described here, is produced by software or algorithmic means described above to slope the image as if it were projected on a receding plane whose front is the lower horizontal edge of the picture, and whose far edge is at the top. M. Weiner, in U.S. Pat. No. 3,339,454, first described the method of slanting or sloping a planar photo or projected image and placing it behind a frame through which it might be viewed. Weiner sought to approximate stereoscopic depth by this means. He reasoned that typical scenes have the lower portion closer to the observer than the top portion of the scene. (Shanks, in U.S. Pat. No. 4,441,565 discusses a similar method but relies on projecting a planar image on a saddle shaped curve or surface.)

Parallax will be generated using this slanted or tipped image, but the parallax is only associated with the sloped plane of the screen rather than with an image specific set of homologous points contained within a conventional stereo pair. The addition of the frame is an ingenious touch and provides a means for comparing the depth of the receding image with the frame. The surrounding computer screen serves the same function as Weiner's frame, and provides a reference for the ersatz stereo image formed by the stereoscopic content converter 10.

Skewing is also of interest because, unlike other methods that have been proposed for ersatz stereo, this one can be computed on the fly, virtually in real time. Therefore, no preprocessing of the image is required. The effect tests remarkably well. For many individuals there is little distinguishable difference between a skewed image and a true stereo image.

The content converter 10 also performs a unique and interesting process that we call anaglyph deconstruction (and reconstruction). In this process, an anaglyph, as an inputted format, is outputted as one of the other formats. For example, an anaglyph may be deconstructed and turned into the above/below format or the page flipped format for display on a CRT monitor for use with shuttering eyewear. Thus, the user is able to view and evaluate an image stereoscopically, but without the eye fatigue associated with the anaglyph. In this case, the image no longer has complimentary color components. Instead, the stereo pair is made up of two monochromatic components that are easier to view for most people.

Figure 10:
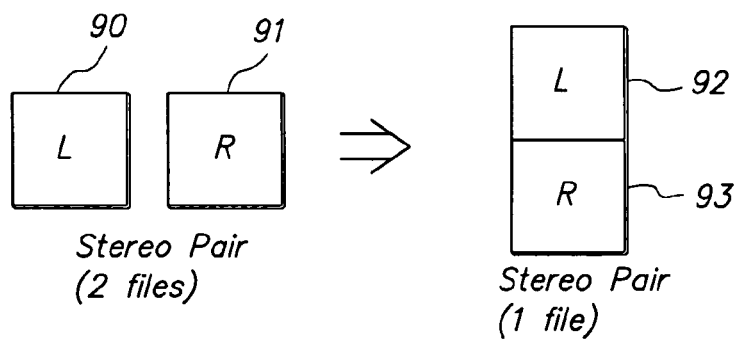
FIG. 10 is a diagram that illustrates a method for handling stereo-pairs.

A special case is created for handling stereo image pairs, i.e., a set of two individual files. The pipeline as well as the media framework is optimized for handling a single media file at a time. As shown in FIG. 10, the stereoscopic content converter handles a pair of stereo files 90, 91 by reading each file independently as a planar source and then obtaining an in-memory copy of each file. A temporary file is then constructed defining a combined image, with the left file 92 stored on top and the right file 93 stored on bottom. This single image format is understood in the stereoscopic content converter 10 and the pipeline as a "stereo pair" and is easily processed.

Because of the lack of support in the media framework for simultaneously playing multiple files, stereo movie pairs are not currently supported. It would be a straightforward task to develop a utility program or utilize a video-editing program (such as Adobe Premiere) to combine left and right movies into a single movie with left and right content in each frame.

Figure 11:
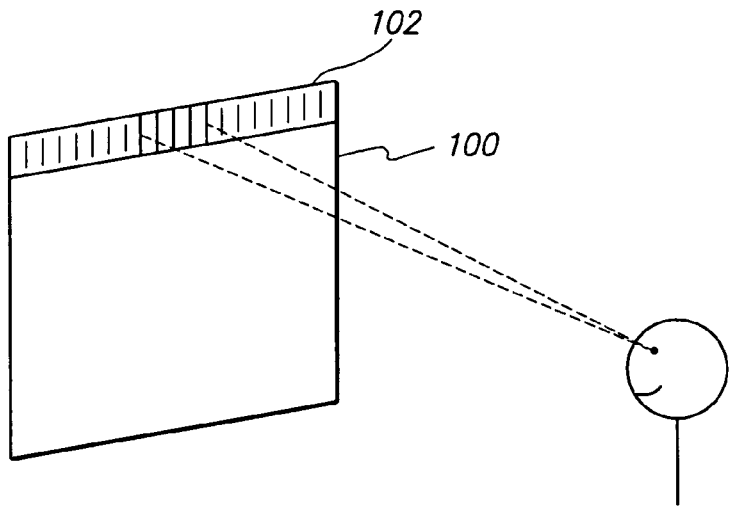
FIG. 11 is an illustration of how a viewer uses a view-alignment strip to properly locate his/her head with respect to the display screen.

Viewing content on the SynthaGram autostereo monitor requires the user to stay in a relatively small viewing zone. This zone is easy to find when viewing some content (e.g. test images), but more difficult when viewing other types of content. We have experimented with some techniques and discovered that a properly formatted view alignment strip 102 located at the top of the displayed frame 100, as shown in FIG. 11, works well in this task. The strip 102 is designed such that a yellow strip appears brightest when viewed from a central location. When viewing content on the SynthaGram monitor, a user simply has to first position him/herself so that the strip 102 shows the yellow strip brightly, and then move his/her eyes down slightly to correctly view the content.

Figure 12:
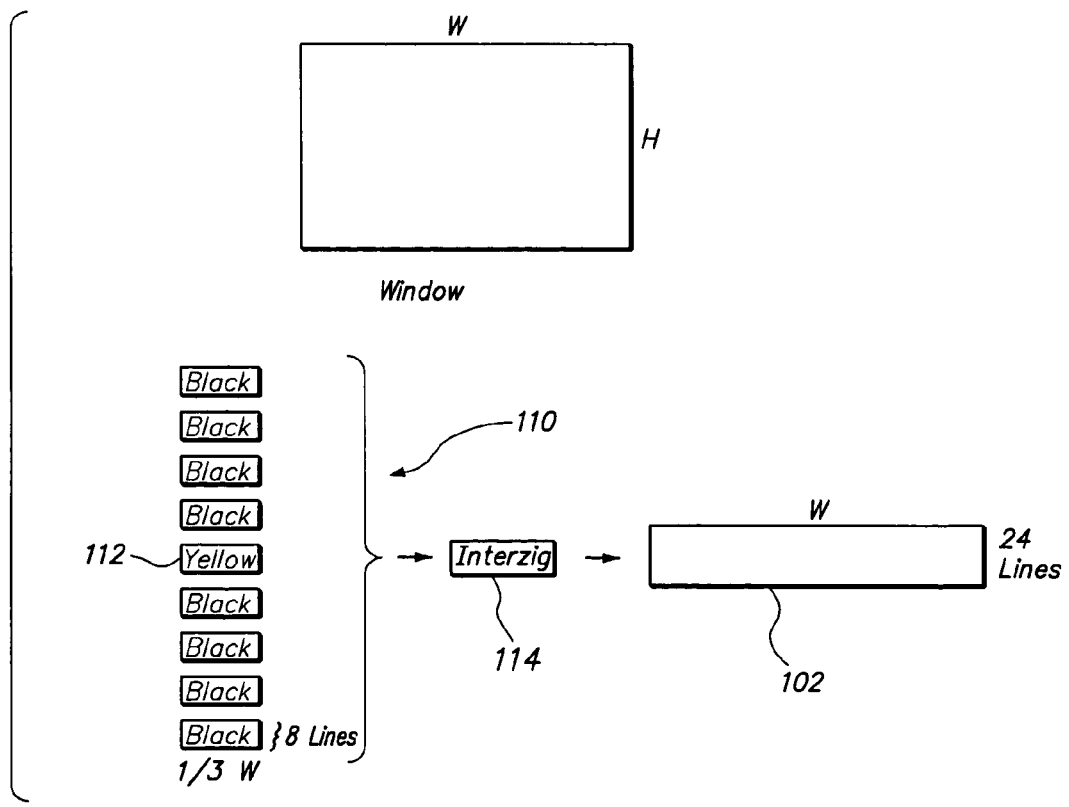
FIG. 12 is an illustration of the construction of the view-alignment strip.

The strip 102 is constructed using the same SynthaGram settings that the content is formatted with. As shown in FIG. 12, a series of an odd number of views 110 are used with the center view 112 containing yellow pixels and the other pixels containing black pixels. The views 110 have a narrow aspect ratio (⅓ window width×8 lines). The views 110 are then interzigged in block 114 using the proper settings for the monitor. The resulting strip 102 (window width×24 lines) is then composited on top of the displayed window.

We have described a series of methods for converting from one stereo format to another. We have crafted our method to be compatible with the ubiquitous Windows operating system, but obviously it is not limited to Windows. We have also described simple for producing an ersatz stereo image from a planar image. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. Thus, with regard to the claims appended to this application, the full range of scope afforded by the language of these claims is not to be limited by any of the embodiments set forth above.

The invention claimed is:

1. A method of converting an input image having a source format to an output image having a desired stereoscopic format, wherein the input image and the output image are each defined by a plurality of pixels, comprising:

receiving the input image having the source format at a format converter configured to receive images in multiple formats and convert the images in multiple formats into images having stereoscopic formats;

identifying, using a support table matrix, display methods that are compatible with the source format of the input image;

allowing a desired display method to be chosen from identified compatible display methods, the desired display method corresponding to the desired stereoscopic format;

converting each pixel of the input image to a corresponding pixel for an output image in accord with a the support table matrix, which sets forth a predefined relationship between the source format and the desired stereoscopic format, thereby creating the output image; and displaying the formatted output image using the desired display method.

2. The method of claim 1, further comprising creating the support table matrix to set forth predefined relationships between one type of format as an input image and another type of stereoscopic format as an output image.

3. The method of claim 1, wherein the converting step comprises the sequential steps:

converting the color space of the input image;
scaling the input image;
creating additional views as needed;
swapping views;
preparing a presentation of the output image for a particular format type;
centering the presentation;
formatting the presentation thereby creating a formatted output image; and
displaying the formatted output image.

4. The method of claim 3, further comprising inverting the input image after the scaling step and before the creating step.

5. The method of claim 3, further comprising aligning the views after the creating step and before the swapping step.

6. The method of claim 3, further comprising arranging a predefined view wherein a single frame contains nine views, then interzigging the views, after the swapping step and before the preparing step.

7. The method of claim 1, wherein the input image is a planar image, further comprising creating a stereo image pair from the planar image.

8. The method of claim 7, wherein the creating step comprises:

scaling the planar image by a fixed percentage to create a scaled image;
copying the scaled image to create a complimentary image;
shifting the complimentary image by a smaller percentage of the fixed percentage;

extracting a centered image from the scaled image; and
extracting a centered image from the shifted complimentary image.

9. The method of claim 8, wherein the smaller percentage is half.

10. The method of claim 7, wherein the creating step comprises:
scaling the planar image by a fixed percentage to create a scaled image;
copying the scaled image to create a complimentary image;
skewing the complimentary image;
extracting a centered image from the scaled image; and
extracting a centered image from the shifted complimentary image.

11. The method of claim 10, wherein the complimentary image is skewed by approximately half.

12. The method of claim 1, wherein the source format is planar.

13. A device for converting an input image having a source format to an output image having a desired stereoscopic format, wherein the input image and the output image are each defined by a plurality of pixels, comprising:
a software-enabled matrix that sets forth predefined relationships between one format for image input and a different format for image output, wherein the software-enable matrix is operable to be used to identify display methods that are compatible with the source format of the input image; and
a processor configured to receive images in multiple formats and convert images received in multiple formats into images in stereoscopic format and further configured to identify the source format of the input image, allow a desired display method to be chosen from compatible display methods, and convert the input image using the matrix to an output image having the desired stereoscopic format corresponding to the desired display method.

14. A device according to claim 13, wherein the software-enabled matrix contains for each type of image format a pre-defined correspondence between a pixel from the input image and a pixel for the output image.

15. A method of converting an input image in a source stereoscopic format to an output image having a desired stereoscopic format, comprising:

receiving the input image in the source stereoscopic format at a multiple format image converter configured to receive input images in different stereoscopic formats and convert input images in various stereoscopic formats into images having different stereoscopic formats;
identifying, using a support table matrix, display methods that are compatible with the source stereoscopic format of the input image;
allowing a desired display method to be chosen from identified compatible display methods, the desired display method corresponding to the desired stereoscopic format; and
converting each pixel of the input image to a corresponding pixel for the output image in accord with the support table matrix, which sets forth a predefined relationship between the source stereoscopic format and the desired stereoscopic format, thereby creating the output image.

16. The method of claim 15, wherein converting comprises creating the map as a matrix that sets forth predefined relationships between one type of stereoscopic format as an input image and another type of stereoscopic format as an output image.

17. The method of claim 15, wherein converting comprising:
converting the color space of the input image;
scaling the input image;
creating additional views needed;
swapping views;
preparing a presentation of the output image for a particular format type;
centering the presentation;
formatting the presentation thereby creating a formatted output image; and
displaying the formatted output image.

18. The method of claim 17, further comprising inverting the input image after scaling and before creating.

19. The method of claim 17, further comprising aligning the views after creating and before swapping.

20. The method of claim 17, further comprising arranging a predefined view wherein a single frame contains nine views, then interzigging the nine views, after swapping and before preparing.

* * * * *